United States Patent [19]

Schwenninger

[11] 4,322,235

[45] Mar. 30, 1982

[54] FLOAT GLASS FORMING CHAMBER WITH HORIZONTAL HEATING ELEMENTS

[75] Inventor: Ronald L. Schwenninger, Ridgeley, W. Va.

[73] Assignee: PPG Industries, Inc., Pittsburgh, Pa.

[21] Appl. No.: 195,283

[22] Filed: Oct. 8, 1980

[51] Int. Cl.³ .................................................. C03B 18/10
[52] U.S. Cl. .................................... 65/182.3; 65/182.5
[58] Field of Search ................... 65/182.1, 182.3, 182.4, 65/346, 182.5

[56] References Cited

U.S. PATENT DOCUMENTS 3,233,995  2/1966  Javaux ........................... 65/182.4 X
3,301,651  1/1967  Long ................................ 65/182.1

Primary Examiner—Arthur D. Kellogg
Attorney, Agent, or Firm—Dennis G. Millman

[57] ABSTRACT

A float glass forming chamber is provided with heating elements that extend through the side walls of the chamber. As a result, the roof of the chamber may be of simpler construction, the heating elements are more accessible, and electrical connections can be more conveniently arranged.

17 Claims, 5 Drawing Figures

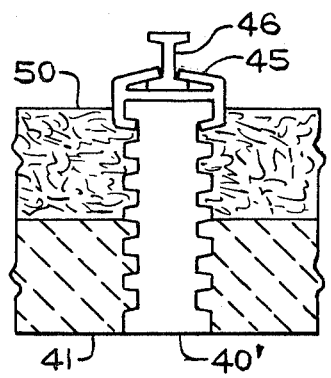
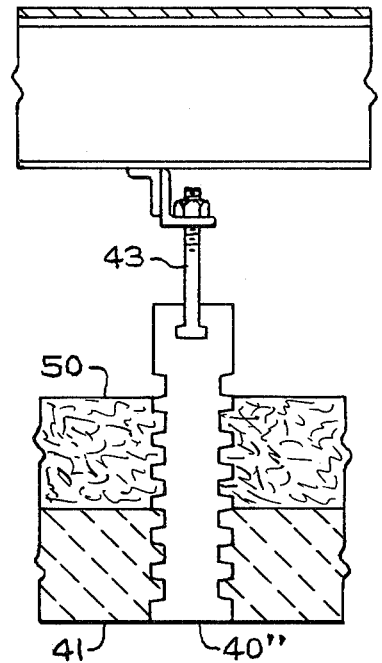
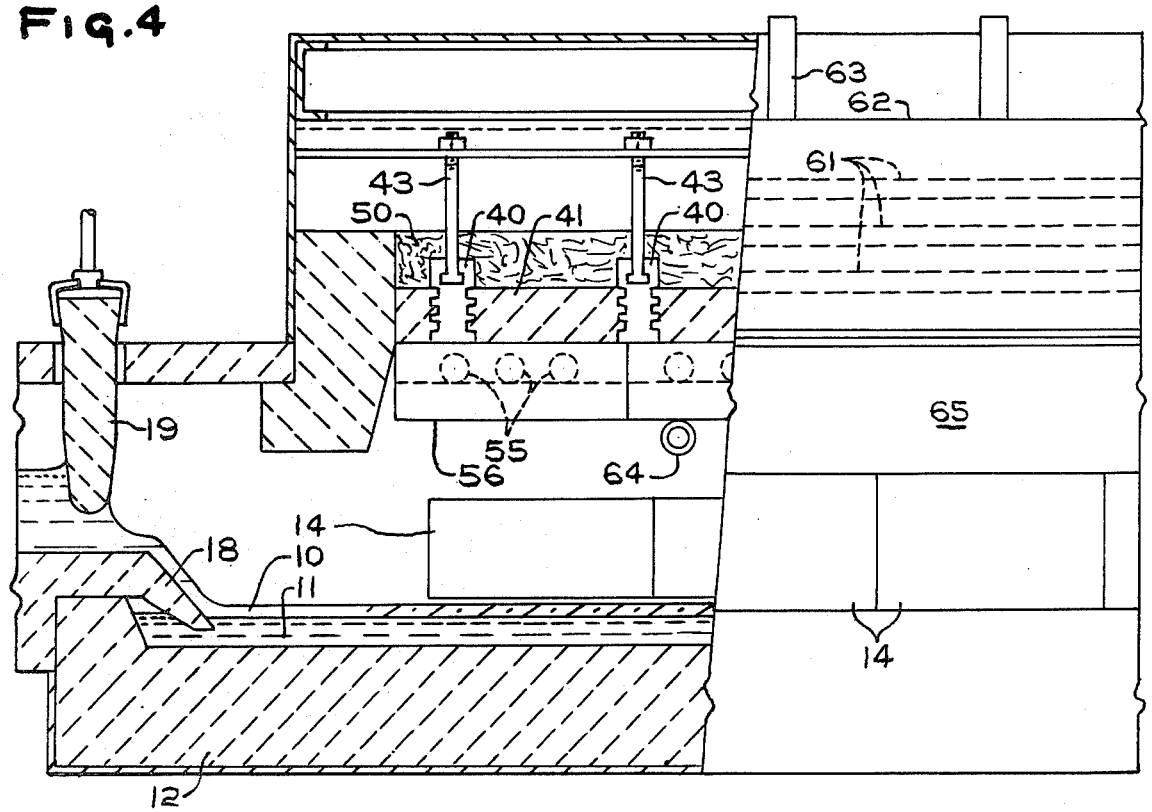

FLOAT GLASS FORMING CHAMBER WITH HORIZONTAL HEATING ELEMENTS

BACKGROUND OF THE INVENTION

In the float process for forming flat glass, molten glass is drawn from a melting furnace and passed to a forming chamber (or "float bath") where the molten glass is deposited onto an elongated pool of molten metal such as tin or copper or alloys thereof. There, a ribbon of glass is stretched to the desired thickness as it progresses along the elongated pool of molten metal and is then withdrawn from the forming chamber as a continuous ribbon at the exit end of the forming chamber. Because of the fluid support provided by the molten metal to the glass, glass of superior optical quality can be produced by the float process.

Unfortunately, a float glass forming chamber is not free from distortion producing effects. One such effect is the "drip" problem which is caused by dripping of molten droplets of metal or compounds thereof from the roof of the forming chamber onto the glass ribbon. Although the atmosphere within the float forming chamber is usually positively pressurized with an inert or reducing gas atmosphere, sulfur and oxygen are introduced into the chamber from the glass ribbon and from other sources and these combine with the metal of the molten metal bath to form sulfides and oxides (e.g., tin sulfide and tin oxide) which volatilize and condense on ralatively cool portions of the interior surface of the float chamber. The condensation accumulates on the structural members of the bath interior, and under certain temperature and chemical conditions will be reduced to elemental metal (tin), which eventually falls as droplets onto the glass ribbon. The impact of the metallic droplets on the soft glass ribbon produces indentations which appear as optical distortions in the final glass product. This defect is known variously as "tin drip," "crater drip," "top drip," or "tin speck."

It has now been found that the drippage problem is aggravated by the roof configuration conventionally employed in float forming chambers. The roof design commonly in use comprises a complex grid of relatively small ceramic pieces interlocked with one another and suspended from above by a large number of metallic rods. The design includes a large number of vertically extending electrical heating units supported within openings in the grid. Other openings in the grid are filled with blind plugs. The result is an interior roof surface which is non-planar and has a relatively large surface area and a large number of joints and vertically extending cracks and surfaces. Such a complex roof structure encourages condensation and dripping of volatilization products. The large number of crevices permits ingress of cooler exterior atmosphere which promotes condensation. The non-planar surfaces tend to increase running and coalescing of condensation products. More recent designs of float bath roofs have simplified the support grid design so as to extend across the float chamber in only the transverse direction for the sake of simplified construction. However, the revised design still possesses the drawbacks of a large number of joints and non-planar interior surfaces.

Aside from the drippage problem, the prior art roof designs disadvantageously entail a bulky and complex arrangement for providing electrical connections to the arrays of vertical heating elements. The arrangement includes a maze of bus bars and leads housed in a relatively large enclosure above the roof, making repairs or modifications to the roof or heaters extremely difficult. The complexity of the prior art electrical connection arrangement additionally increases the time and cost of initial construction. Accordingly, it would be desirable to simplify the heater arrangement as well as the roof construction.

SUMMARY OF THE INVENTION

In the present invention, the roof of a float glass forming chamber is nearly monolithic, with a nearly planar, horizontal, interior surface, thereby discouraging the formation and dripping of condensed volatiles from the roof onto the glass ribbon. This is achieved by having heater elements extend into the chamber horizontally through the side walls rather than vertically through the roof. As a result, a large number of openings through the roof is eliminated, thereby permitting the use of a simplified roof design. Accordingly, the sources of drippage are reduced.

Additionally, by extending the heater elements horizontally, the electrical connections may be located on the side of the float chamber rather than overhead, thereby simplifying the bus bar arrangement and greatly reducing the amount of clutter and the size of the enclosure above the roof. Furthermore, access to the roof as well as to the heater elements is considerably improved.

THE DRAWINGS

FIG. 2 is a cross-sectional view of an alternate hanger arrangement for the float chamber roof of the present invention.

FIG. 3 is yet another alternate embodiment of a hanger arrangement for the float forming chamber of the present invention.

FIG. 4 is a side view, partly broken away, of a preferred embodiment of a float glass forming chamber in accordance with the present invention.

DETAILED DESCRIPTION

Figures 1A, 1B:
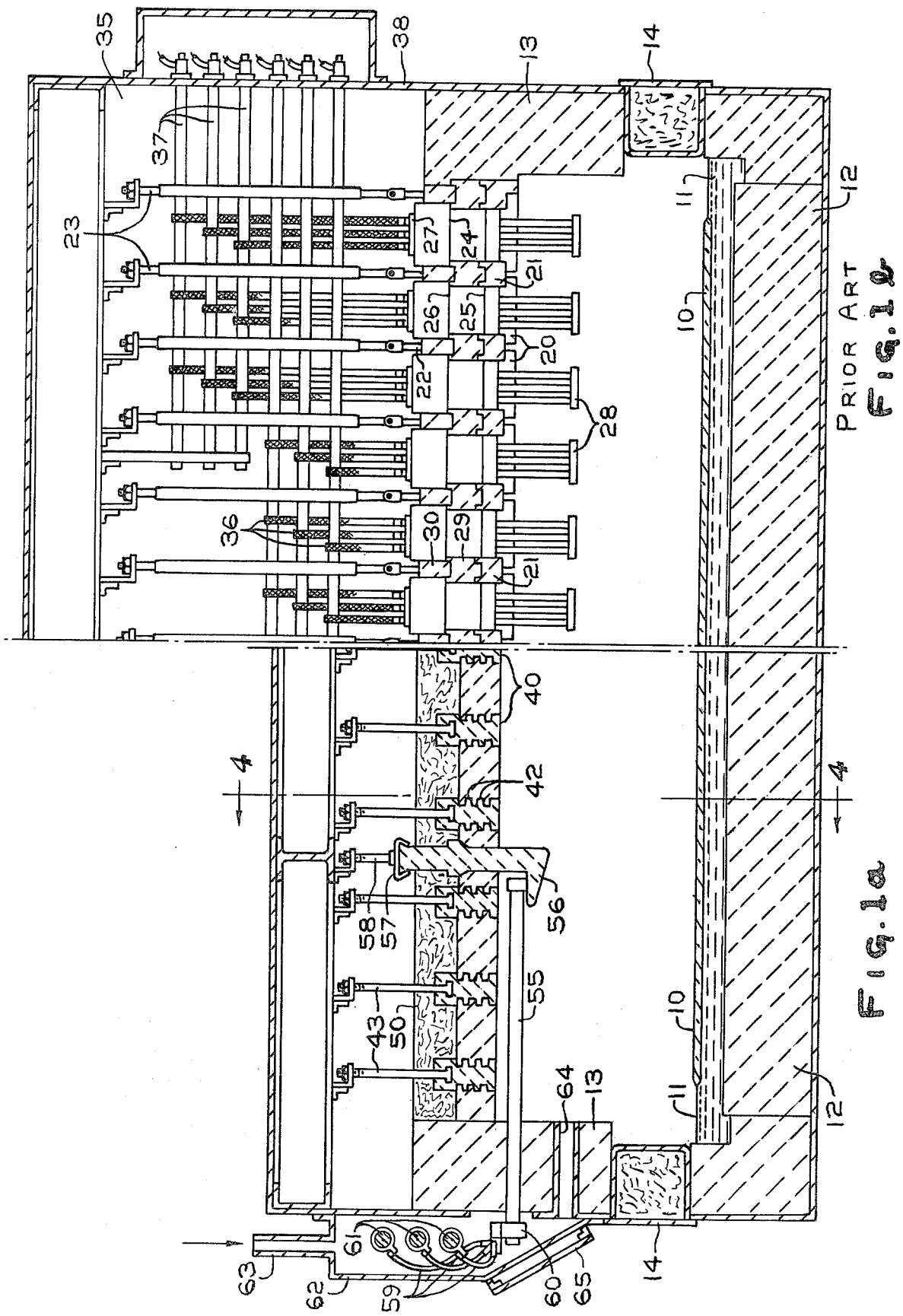
FIG. 1a is a transverse cross-sectional view of a preferred embodiment of a float glass forming chamber in accordance with the present invention.
FIG. 1b is a transverse cross-sectional view of a conventional prior art float glass forming chamber shown for comparison.

In FIG. 1a and FIG. 1b there is shown, side-by-side for comparison, float bath roof designs in accordance with a preferred embodiment of the present invention (FIG. 1a) and the conventional prior art float bath roof (FIG. 1b). In both, a ribbon of glass 10 being attenuated to the desired thickness floats on a pool of molten metal 11 (usually tin, although copper or mixtures of tin and copper may also be employed). Minor amounts of other metals such as iron may also be included in the molten metal bath. The metal bath is contained within a refractory vessel comprising a bottom 12 and side walls 13 having access openings that may be closed by means of side seals 14.

In the prior art roof arrangement as shown in FIG. 1b, the basic support grid comprises a large number of transversely extending support members 20 and longitudinally extending support members 21, both of which are preformed ceramic pieces. Vertically extending hanger rods 22 have hook-like members at their lower ends (not shown) which engage and interlock the ends of adjacent transverse support members 20. The longitudinal support members 21 span adjacent rows of the transverse support members 20 upon which they rest at opposite ends. The hanger rods 22 are, in turn, supported from above by rods 23 fastened at their upper ends to the overhead superstructure. The spacing between adjacent hanger rods both transversely and longitudinally in such a system is typically on the order of 30 centimeters or less. Into the rectangular openings in this grid are inserted a large number of heater elements, each of which consists of a sandwich of a plurality of pieces of refractory material 24, 25, 26, and 27 fastened together by means of vertically extending tie rods (not shown) and a vertically extending three-legged electrical resistance heating element 28 passing through the refractory pieces. The bottom refractory member 25 of the composite heating element overlaps and rests upon adjacent transverse support members 20. The spaces between the heating elements are filled with additional refractory members 29 and 30 which rest on the longitudinal support members 21 between the hangers 22. Heater elements are shown inserted into each of the grid openings in FIG. 1b as is the case in some zones of a conventional float chamber, but in other zones a particular cross-section may have some or even all of the openings filled with blind plugs rather than heater elements.

The prior art arrangement as shown in FIG. 1b employs a relatively large upper plenum chamber 35 to accommodate electrical connections to the heater elements. Each leg of the resistance heater elements 28 is connected at its upper end to a lead 36 which is, in turn, connected to a bus bar 37 in a three phase alternating current system. Because the float chamber is usually provided with an inert or reducing gas atmosphere, the entire chamber, including the upper plenum, is enclosed in a metal casing 38 to make the structure essentially gas-tight. To prevent oxidation of and to cool the electrical connections within the upper plenum 35, the inert or reducing gas atmosphere is usually fed to the upper plenum 35 from which it passes into the main forming chamber through cracks in the roof structure. This infusion of relatively cool gases through the roof structure is also believed to have a detrimental effect on the problem of drippage from the roof.

The drawings illustrate an embodiment of the horizontal heater arrangement of the present invention in connection with a cast float chamber roof design which is the subject matter of a copending U.S. patent application Ser. No. 195,282 filed on even date herewith by Ronald L. Schwenninger and entitled "Float Glass Forming Chamber with Cast Roof." It should be understood that other roof designs may be employed with the present invention, and in particular that the roof need not be cast in place. The heater arrangement of the present arrangement permits the use of roof designs that are generally more planar and freer of interruptions than prior art designs, an example of which is the cast roof which will be described hereinafter.

In the longitudinal cross-section of FIG. 4, there may be seen details of the inlet to the float chamber where molten glass is delivered between a threshold 18 and a metering gate or "tweel" 19 onto the molten metal 11 of the float forming chamber. The illustrated cast roof in FIGS. 1a and 4 includes a plurality of refractory anchors 40 about which is cast a refractory material 41 in the form of a flat slab having an essentially horizontal planar bottom surface facing the interior of the float chamber. The anchors 40 are preformed of a ceramic material and have a plurality of lugs 42 projecting from their sides to interlock with the cast material. Each of the anchors 40 is supported from a vertically extending rod 43, the upper end of which is fastened to the superstructure. The anchors may be generally square in a horizontal cross-section, but may take a variety of forms and may be suspended in a number of ways. Two variations are shown in FIGS. 2 and 3.

In FIG. 2, a slightly different form of anchor 40' is engaged at its upper end by a clamping plate 45 which is hung directly from an "I" beam 46 extending across the float chamber a short distance above the roof. This arrangement eliminates the use of vertical hanger rods and minimizes the size of the enclosed space above the roof.

In FIG. 3, another embodiment of anchor is shown which is hung in the same manner as that shown in FIG. 1A and FIG. 4. In FIG. 3 anchor 40'', however, is of extended height so that the connection to the hanger rod 43 is exposed within the upper plenum space and is in a relatively cool environment.

The roof may include joint-free sections much larger than those employed in conventional float chamber roofs. However, standard ceramic practice dictates that some joints be provided in the roof to prevent cracking due to non-uniform expansion or contraction during curing or brought on by non-uniform thermal conditions during use. Casting is also most conveniently carried out in sections. Therefore, it is preferred that the roof comprise a plurality of large slabs, each cast around an array of the anchors 40. Typically, each of the slabs may have at least one horizontal dimension on the order of about one meter to two meters and may include about four to sixteen anchors substantially evenly distributed over its area. The actual size of a slab will depend upon the particular castable refractory being used, the geometry and thickness of the slab, and the operating conditions to which the slab will be exposed. An area of at least 1 square meter typically would be feasible. Castable refractories suitable for use are well-known in the art and are preferably of the type characterized as hydraulic-setting refractory concrete. Desirable characteristics include durability and strength at the operating temperatures to which it will be exposed (up to about 1000° C.) and chemical resistance to the reducing gas atmosphere usually maintained in the forming chamber. Accordingly, the preferred castable refractories have been found to have alumina contents of about 50–70 percent by weight and low iron and sulfur contents. Examples of suitable commercially available castable refractories include those sold under the names "Kaocrete 30" and "Kaocast" (Babcock-Wilcox Co., New York, N.Y.), "Alusa" (Harbison-Walker Refractories, Pittsburgh, Pa.), and "Purocast" (Kaiser Refractories, Columbiana, Ohio).

It is preferred to reduce heat loss from the float forming chamber by applying a layer of insulating material 50 over the cast refractory 41. This may be an additional ceramic material either castable or preformed, but preferably is a loose material such as a high temperature mineral wool product such as "Kaowool," sold by Babcock-Wilcox Co., New York, N.Y.

A preferred heater arrangement is depicted in FIGS. 1a and 4, wherein horizontally extending heating elements 44 pass through upper portions of the side walls of the float chamber and overlie marginal edge portions of the glass ribbon 10. The horizontally extending heating elements 55 may be of the same three-legged type for use with three phase power supply conventionally used in the prior art vertical orientation, but preferably of longer length. The heating elements 55 pass through the side wall 16 and at their inner ends may be supported by a preformed ceramic hanger member 56. The heater hanger 56 may extend through the roof of the chamber where its upper end may be engaged by suitable clamping means 57 by which it is provided with vertical support from the overhead superstructure by way of rods 58. It is possible to omit the hangers 56 and to provide cantilever support to the heating elements from their outside ends only, but support at the inner ends by use of the hangers is preferred to avoid undue stress on the heater elements.

As can be seen in FIG. 4, a plurality of heater elements 55 may be spaced along both sides of the float chamber. The spacing may vary in accordance with the heat requirements of a particular zone of a chamber, and in some zones no heaters may be required. Te heat requirements can vary during operation, and it is an advantage of the present invention that heating elements can be readily removed or added during operation.

The length to which the heating elements extend into the chamber may also vary, but it has been found that the entire width of the float chamber need not be heated. Therefore, since the side portions of the chamber tend to be cooler than the center, it is advantageous that the side-mounted heaters of the present invention direct heat primarily to the side portions of the chamber. This differential heating of the side portions of the chamber may be aided by radiant shading by the hangers 56, and the effect may be enhanced by increasing the lower extent of the hangers. Typically, each heater element may extend into the chamber a distance 25 percent or less of the interior width of the chamber.

The three-legged heating elements 55 are shown in the drawings in their usual orientation with the legs lying in a common horizontal plane. It may be noted, however, that each element could be inclined so that each of the three legs lies in a different horizontal plane, whereby the elements may overlap one another so as to increase the density of the heating elements.

The outside end of each leg of the heaters 55 is connected to an electrical cable by means of a clamp 60. Each of the cables, in turn, are connected to a bus bar 61 which, in a preferred embodiment, may extend horizontally along the side of the float chamber. In such an arrangement, the bus bars and electrical connections may be housed within an enclosure 62 extending along the side of the float chamber. The protective non-oxidizing atmosphere for the float chamber may be passed into the enclosure 62 through a conduit 63 and then into the float chamber through a conduit 64 extending through the side wall of the chamber so that the electrical connections may be cooled and protected from oxidation. In this manner, the bulky upper plenum chamber housing the electrical connections in the prior art arrangement has been advantageously eliminated and replaced by the compact, more easily accessible enclosure 62. Eliminating the overhead electrical connections also renders the roof of the float chamber more accessible for servicing and repair and simplifies initial construction.

Side seals 14 are occasionally removed for the insertion of glass stretching devices or other equipment or to perform maintenance. A heat shield 65 is provided on the underside of housing 62 to provide additional thermal protection to the electrical connections during such times when heat is eminating from an open side seal.

A specific, preferred embodiment has been described in detail for the sake of illustrating the invention and for disclosing the best mode, but it should be understood that other variations and modifications as are known to those of skill in the art may be resorted to without departing from the scope of the invention as defined by the claims which follow.

What is claimed is:

1. Apparatus for producing flat glass by the float process comprising an elongated enclosure adapted to hold a pool of molten metal, means for delivering a stream of molten glass into the enclosure onto the molten metal, means for drawing the glass along the length of the enclosure and for withdrawing the glass from the enclosure as a formed ribbon, and heating means within the enclosure for controlling the temperature of the glass comprising horizontally elongated elements extending into the enclosure through sidewalls of the enclosure and supported above the molten metal at their ends within the enclosure by a refractory hanger member suspended within the enclosure.

2. The apparatus of claim 1 wherein the heating means comprise elongated electrical resistance heating elements.

3. The apparatus of claim 2 wherein the heating means are three-legged elements adapted for three-phase alternating current, and each leg is rod shaped.

4. The apparatus of claim 2 wherein one end of each heating element lies outside the enclosure and is engaged by electrical connection means, said one end and said connection means being enclosed in a housing alongside a sidewall of the enclosure.

5. The apparatus of claim 4 wherein the electrical connection means include bus bars extending along a side of the enclosure within the housing.

6. The apparatus of claim 1 wherein the heating means are supported at their ends within the enclosure by a refractory hanger member suspended within the enclosure.

7. The apparatus of claim 1 wherein a plurality of said heating means are spaced along opposite sides of the enclosure and overlie less than the full width of the molten metal pool within the enclosure.

8. The apparatus of claim 7 wherein at least some of the heating elements extend into the enclosure a distance less than 25 percent of the width of the enclosure.

9. The apparatus of claim 1 wherein at least a portion of the enclosure is provided with a roof structure presenting an interior surface which is substantially planar over a major portion of its area.

10. The apparatus of claim 1 wherein sidewalls of the enclosures are provided with access openings, and the heating elements pass through the sidewalls above said access openings.

11. The apparatus of claim 4 wherein means are provided for passing non-oxidizing atmosphere into the housing.

12. The apparatus of claim 11 further including means to pass the non-oxidizing atmosphere from the housing into the enclosure.

13. Apparatus for producing flat glass by a float process comprising an elongated enclosure adapted to hold a pool of molten metal, means for delivering a stream of molten glass into the enclosure and onto the molten metal, means for drawing the glass along the length of the enclosure and for withdrawing the glass from the enclosure as a formed ribbon, and a plurality of alternating current electrical heating elements within the enclosure for controlling the temperature of the glass, each heating element comprising a plurality of horizontally elongated legs extending into the enclosure through sidewalls of the enclosure and supported above the molten metal along a minor portion of the interior width of the enclosure, the elongated legs of each heating element being spaced apart from one another horizontally and in electrical communication with one another at their ends within the enclosure.

14. The apparatus of claim 13 wherein each heating element includes three of said elongated legs.

15. The apparatus of claim 14 wherein the end of each of said elongated legs outside the enclosure is provided with electrical connection means for connecting the heating means to a three phase alternating current electrical power source.

16. Apparatus for producing flat glass by the float process comprising an elongated enclosure adapted to hold a pool of molten metal, means for delivering a stream of molten glass into the enclosure onto the molten metal, means for drawing the glass along the length of the enclosure and for withdrawing the glass from the enclosure as a formed ribbon, heating means within the enclosure for controlling the temperature of the glass comprising horizontally elongated elements extending into the enclosure through sidewalls of the enclosure and supported above the molten metal, electrical connection means engaging portions of each heating element outside the enclosure, housing means alongside a sidewall of the enclosure for enclosing said electrical connection means and said outside ends of the heating elements, and means for passing a non-oxidizing atmosphere into the housing.

17. The apparatus of claim 16 further including a passage between the interior of the housing and the interior of the enclosure for passing non-oxidizing atmosphere from the housing into the enclosure.

* * * * *